US010774634B2

(12) United States Patent
Stark

(10) Patent No.: US 10,774,634 B2
(45) Date of Patent: Sep. 15, 2020

(54) TELEMETRY SYSTEM USING FREQUENCY COMBS

(71) Applicant: Halliburton Energy Services, Inc., Houston, TX (US)

(72) Inventor: Daniel Joshua Stark, Houston, TX (US)

(73) Assignee: Halliburton Energy Servies, Inc., Houston, TX (US)

(*) Notice: Subject to any disclaimer, the term of this patent is extended or adjusted under 35 U.S.C. 154(b) by 0 days.

(21) Appl. No.: 16/328,156

(22) PCT Filed: Oct. 4, 2016

(86) PCT No.: PCT/US2016/055297
§ 371 (c)(1),
(2) Date: Feb. 25, 2019

(87) PCT Pub. No.: WO2018/067121
PCT Pub. Date: Apr. 12, 2018

(65) Prior Publication Data
US 2019/0195065 A1 Jun. 27, 2019

(51) Int. Cl.
E21B 47/135 (2012.01)
H04B 10/25 (2013.01)
(Continued)

(52) U.S. Cl.
CPC .......... *E21B 47/135* (2020.05); *G01V 11/002* (2013.01); *H04B 10/25* (2013.01); *H04B 10/2589* (2020.05); *H04B 10/2519* (2013.01)

(58) Field of Classification Search
CPC ... E21B 47/123; E21B 47/135; G01V 11/002; H04B 10/25; H04B 10/2503; H04B 10/2519; H04B 10/2589
(Continued)

(56) References Cited

U.S. PATENT DOCUMENTS 4,389,645 A 6/1983 Wharton
6,141,127 A * 10/2000 Boivin ................. H04B 10/505
250/227.12
(Continued)

FOREIGN PATENT DOCUMENTS

AU 2008230844 B2 6/2011
EP 0589638 A1 3/1994
(Continued)

OTHER PUBLICATIONS

International Search Report and Written Opinion issued in related PCT Application No. PCT/US2016/055297 dated Mar. 28, 2017, 18 pages.

*Primary Examiner* — Amritbir K Sandhu
(74) *Attorney, Agent, or Firm* — Thomas Rooney; Baker Botts L.L.P.

(57) ABSTRACT

A telemetry system is operable to transmit data by bridging the low signal bandwidth available to high temperature electronics with the high spectral bandwidth available in optical fiber. A transmitter, such as a frequency comb, generates light to a fiber and the light is demultiplexed to separate the light into separate wavelengths. Modulators encode downhole data onto each wavelength and a multiplexer recombines the wavelengths onto a single fiber that passes the light back to the surface where a second demultiplexer separates the light to be transmitted to distinct receivers that detect the encoded data. A dual fiber system may also be utilized. One or more commands may also be transmitted to the downhole tools by transmitted the encoded command to a coupler that is coupled to a multiplexer where a downhole receiver determines the downhole tool that should receive the associated command.

28 Claims, 9 Drawing Sheets

(51) Int. Cl.
*G01V 11/00* (2006.01)
*H04B 10/2519* (2013.01)

(58) Field of Classification Search
USPC .................................................. 398/140–172
See application file for complete search history.

(56) References Cited

U.S. PATENT DOCUMENTS

| | | | |
|---|---|---|---|
| 6,631,019 | B1 | 10/2003 | Vujkovic-Cvijin et al. |
| 6,901,184 | B2 | 5/2005 | Zami |
| 7,515,774 | B2 | 4/2009 | Vannuffelen et al. |
| 7,561,807 | B2 | 7/2009 | Doerr et al. |
| 7,881,620 | B2 | 2/2011 | Nicholson et al. |
| 7,912,647 | B2 | 3/2011 | DiFoggio |
| 7,929,812 | B2 | 4/2011 | Vannuffelen et al. |
| 7,982,632 | B2 | 7/2011 | Miller, Jr. |
| 10,358,915 | B2 * | 7/2019 | Stark ..................... E21B 47/135 |
| 10,494,917 | B2 * | 12/2019 | Stark ..................... E21B 47/04 |
| 2002/0191904 | A1 | 12/2002 | Kani et al. |
| 2002/0196993 | A1 | 12/2002 | Schroeder |
| 2005/0058462 | A1 | 3/2005 | Talebpour et al. |
| 2008/0317462 | A1 * | 12/2008 | Chi .................... H04B 10/0793 398/13 |
| 2009/0038974 | A1 | 2/2009 | Yamate et al. |
| 2010/0018703 | A1 | 1/2010 | Lovell et al. |
| 2010/0178057 | A1 * | 7/2010 | Shieh .................. H04L 27/2637 398/79 |
| 2010/0194588 | A1 | 8/2010 | Menezes et al. |
| 2011/0097083 | A1 | 4/2011 | Barrett |
| 2014/0064734 | A1 | 3/2014 | Witzens |
| 2015/0014521 | A1 * | 1/2015 | Barfoot ..................... G01V 5/04 250/261 |
| 2016/0319658 | A1 * | 11/2016 | Chia .................... E21B 47/135 |
| 2018/0269966 | A1 * | 9/2018 | Stark ..................... E21B 47/135 |
| 2019/0195065 | A1 * | 6/2019 | Stark ..................... H04B 10/25 |
| 2019/0292906 | A1 * | 9/2019 | Stark ..................... G01H 9/004 |

FOREIGN PATENT DOCUMENTS

| | | | | |
|---|---|---|---|---|
| WO | 2009/048821 | A2 | 4/2009 | |
| WO | 2016/068931 | A1 | 5/2016 | |
| WO | 2017/082928 | A1 | 5/2017 | |
| WO | WO-2017138959 | A1 * | 8/2017 | ........... H04B 10/505 |
| WO | 2017/151134 | A1 | 9/2017 | |

* cited by examiner

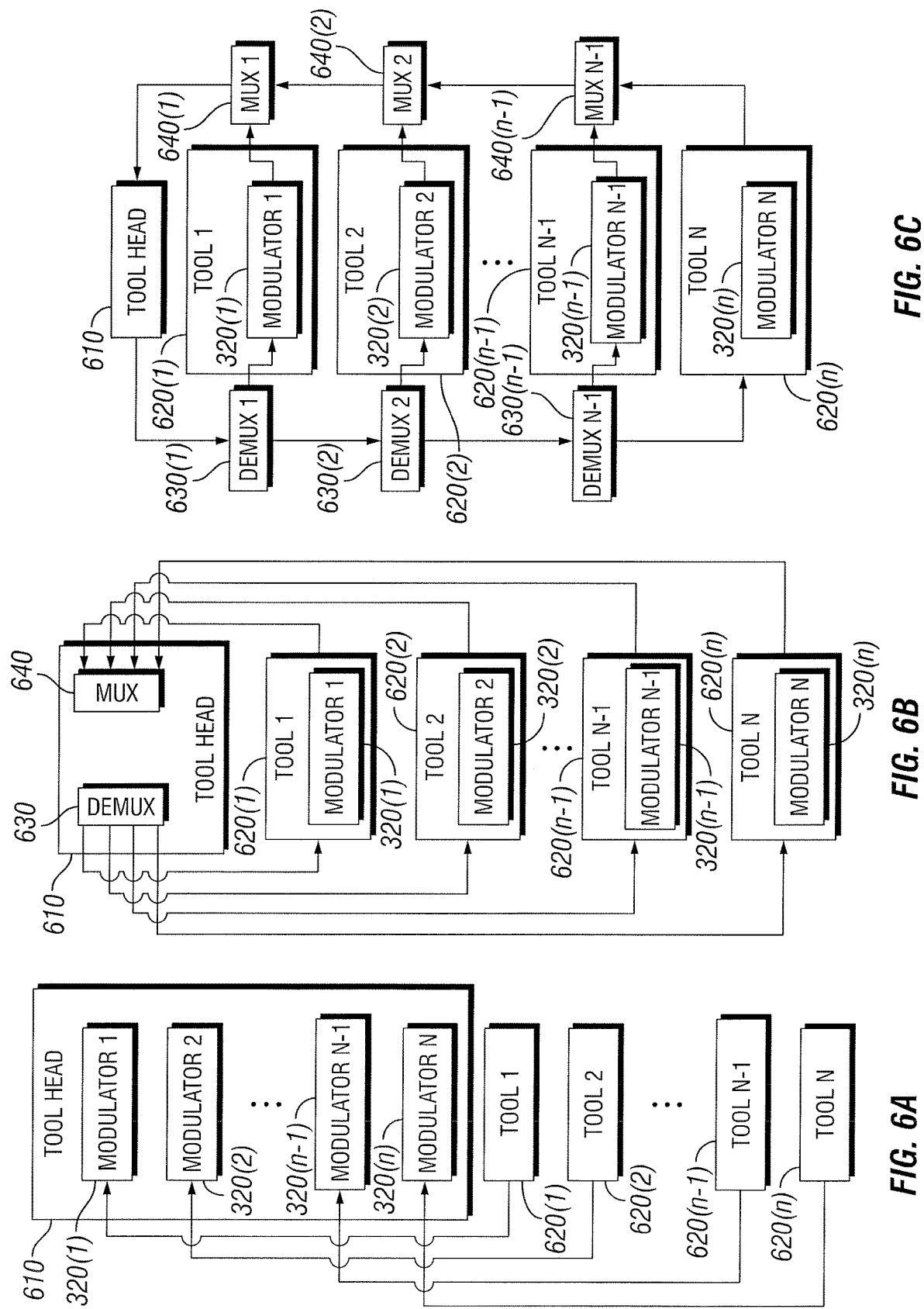

TELEMETRY SYSTEM USING FREQUENCY COMBS

CROSS-REFERENCE TO RELATED APPLICATION

The present application is a U.S. National Stage Application of International Application No. PCT/US2016/055297 filed Oct. 4, 2016, which is incorporated herein by reference in its entirety for all purposes.

BACKGROUND

The present disclosure relates generally to well drilling and completion operations and, more particularly, to a telemetry system for conveying and receiving information downhole via coherent light.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Certain drilling systems include measurement and logging devices or various tools that generate data and information downhole. This data and information may, for instance, relate to the physical condition of the drilling system and the characteristics of the subterranean formation surrounding the wellbore. A telemetry system may transmit the data and information from the downhole measurement and logging devices to information handling systems positioned at the surface. A telemetry system may receive data and information from the information handling systems. The total time it takes to communicate data and information to and from the surface may affect the drilling system's ability to implement real-time or near real-time computations or commands. That time may be affected by the transmission speed of the telemetry system as well as the data bandwidth afforded by the transmission medium. Implementing high-speed/high-bandwidth communications through a telemetry system can be difficult due to technical limitations as well as the additional expense such systems may require.

FIGURES

Some specific exemplary embodiments of the disclosure may be understood by referring, in part, to the following description and the accompanying drawings.

FIGS. 6A, 6B, 6C and 6D are diagrams illustrating embodiments of modulators in a downhole telemetry element, according to one or more aspects of the present disclosure.

Figure 1:
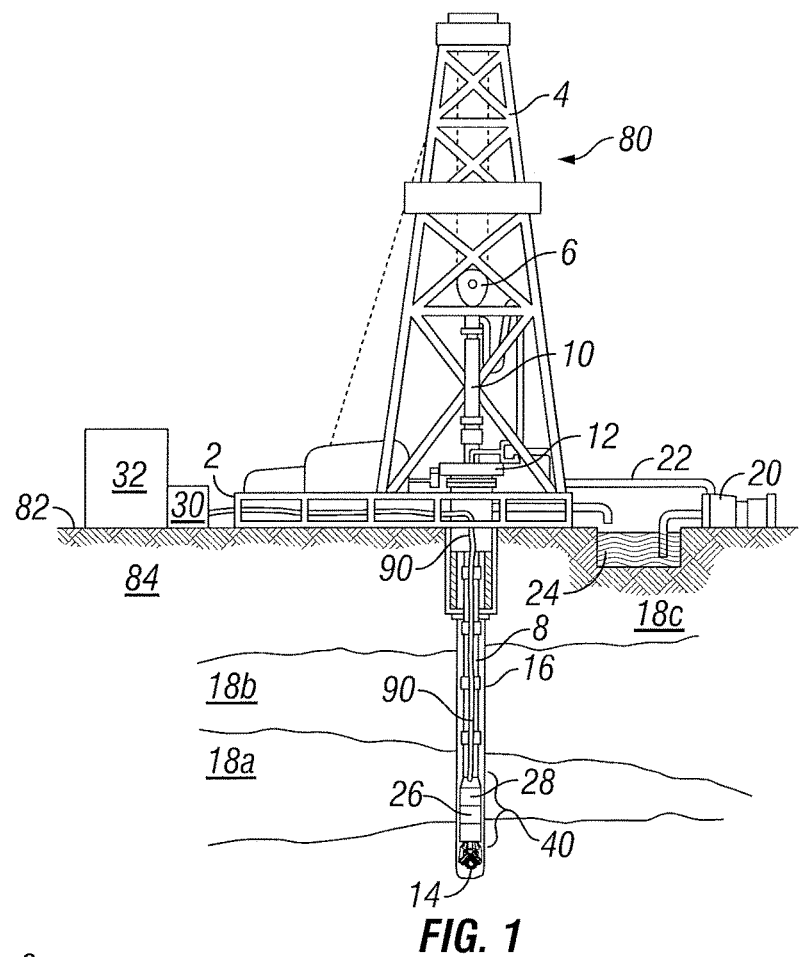
FIG. 1 is a diagram showing an illustrative drilling system, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Any one of the computer readable media mentioned above may store a set of instruction that, when executed by a processor communicably coupled to the media, cause the processor to perform certain steps of actions.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to drilling operations that include, but are not limited to, target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, stimulation wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Modern petroleum drilling and production operations demand information relating to downhole parameters and conditions. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing downtime. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Thus, if a first device communicatively couples to a second device, that connection may be through a direct connection, or through an indirect communication connection via other devices and connections. The indefinite articles "a" or "an," as used herein, are defined herein to mean one or more than one of the elements that it introduces. The term "uphole" as used herein means along the drillstring or the hole from the distal end towards the surface, and "downhole" as used herein means along the drillstring or the hole from the surface towards the distal end.

According to aspects of the present disclosure, a high-speed and high-bandwidth telemetry system may bridge the low signal bandwidth available to high temperature electronics with the high spectral bandwidth available in optical fiber. Electronics with low bandwidths, for example, bandwidths as low as 10 megahertz (MHz) or lower, may be multiplexed to achieve a higher data transfer rate (for example, up to 1 gigabit per second (Gb/s) or higher) while still using low optical amplitude resolution. Such systems may separate data transmission from each downhole tool on a distinct color or channel. Each channel experiences the same attenuation, drift, and interference effects so the same compensation may be used for each downhole tool. As each channel is spectrally narrow, but distinct, equipment (such as modulators, circulators, polarization controllers, or any other suitable element) used in one or more embodiments of a telemetry system according to one or more aspects of the present invention may be spectrally broad and each channel may experience the same or substantially similar optical conditioning. The telemetry systems according to one or more embodiments may be easily expandable to any number of downhole tools.

FIG. 1 is a diagram showing a subterranean drilling system 80 incorporating aspects of a telemetry system. The drilling system 80 comprises a drilling platform 2 positioned at the surface 82. As depicted, the surface 82 comprises the top of a formation 84 containing one or more rock strata or layers for example, 18a, 18b, and 18c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. The drill string 8 comprises drill pipe segments which may comprise one or more downhole tools. A fiber optic line 90 may, as depicted, be coupled to an outer surface of the drill string 8, but other positions with respect to the drill string 8 and pipe segments are possible within the scope of this disclosure. For example, fiber optic line 90 may be run inside drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) 40 coupled to the drill string 8 near the drill bit 14. The BHA 40 may comprise various downhole measurement tools and sensors and LWD and MWD, for example, a tool 26. Tool 26 may be any type of downhole tool. As the bit extends the borehole 16 through the formations 18, the tool 26 may collect measurements relating to borehole 16 and the formation 84. The tools and sensors of the BHA 40 including the tool 26 may be communicably coupled to a downhole telemetry element 28, which may incorporate, for instance, a downhole signal decoder, a power source, and a controller to selectively couple the power source to the signal decoder. The downhole telemetry element 28 may be coupled to a surface telemetry element 30 through the fiber optic line 90. The surface telemetry element 30 may comprise, for instance, a transmitter (such as a frequency comb, a dense wavelength division multiplexing transmitter, a coarse wavelength division multiplexing transmitter, or any other wavelength division multiplexing transmitting device) and one or more receivers. The surface and downhole telemetry elements 28/36 may cooperate to transfer measurements from tool 26 to the surface and/or to receive commands from the surface.

In certain embodiments, the drilling system 80 may comprise a surface control unit 32 positioned at the surface 82. The surface control unit 32 may comprise an information handling system communicably coupled to the surface telemetry element 30 and may receive measurements from the tool 26, transmit commands to the tool 26 or both through the surface telemetry element 30. The surface control unit 32 may also receive measurements from the tool 26 when the tool 26 is retrieved at the surface 82. As described above, the surface control unit 32 may process some or all of the measurements from the tool 26 to determine certain parameters of downhole elements, including the borehole 16 and formation 84.

Figure 2:
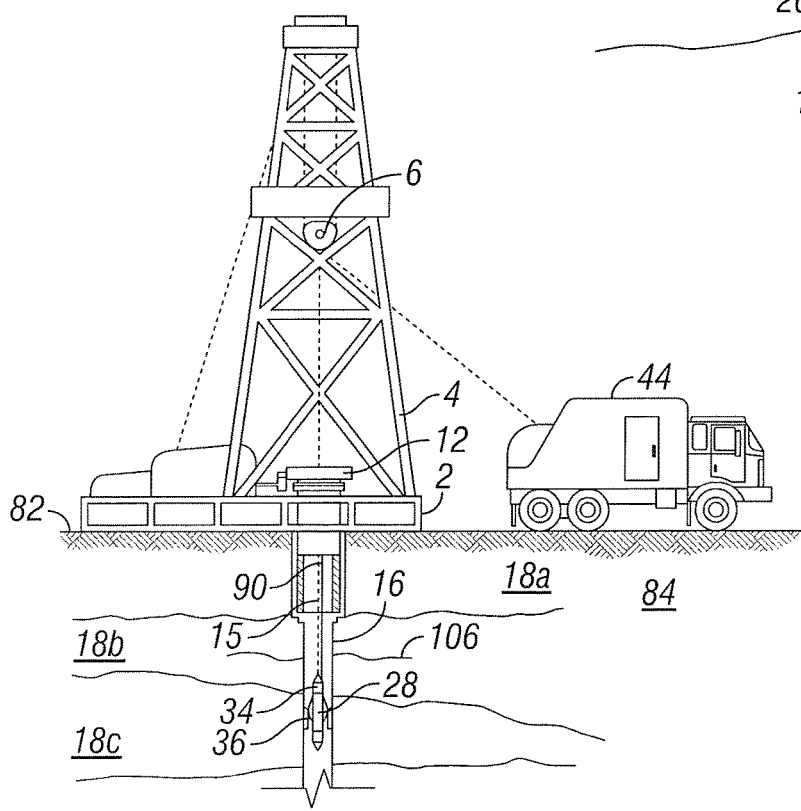
FIG. 2 is a diagram showing an illustrative wireline logging system, according to one or more aspects of the present disclosure.

At various times during the drilling process, the drill string 8 may be removed from the borehole 16 as shown in FIG. 2. Once the drill string 8 has been removed, measurement/logging operations can be conducted using a wireline tool 34, for example, an instrument that is suspended into the borehole 16 by a cable 15 having conductors for transporting power to the wireline tool 34 and telemetry from the tool body to the surface 82. The wireline tool 34 may comprise downhole logging and measurements tools as well as downhole telemetry element 36 similar to those described above or any other type of wireline tool. A fiber optic line 90 may couple to the downhole telemetry element 36. A downhole telemetry element 36 may be coupled to a surface telemetry element through a waveguide within the cable 15. A logging facility 44 (shown in FIG. 2 as a truck, although it may be any other structure) may include the surface telemetry elements and collect measurements from the downhole tools, and may include computing facilities (including, for example, a control unit/information handling system) for controlling, processing, storing, and/or visualizing some or all of the measurements gathered.

Figure 3:
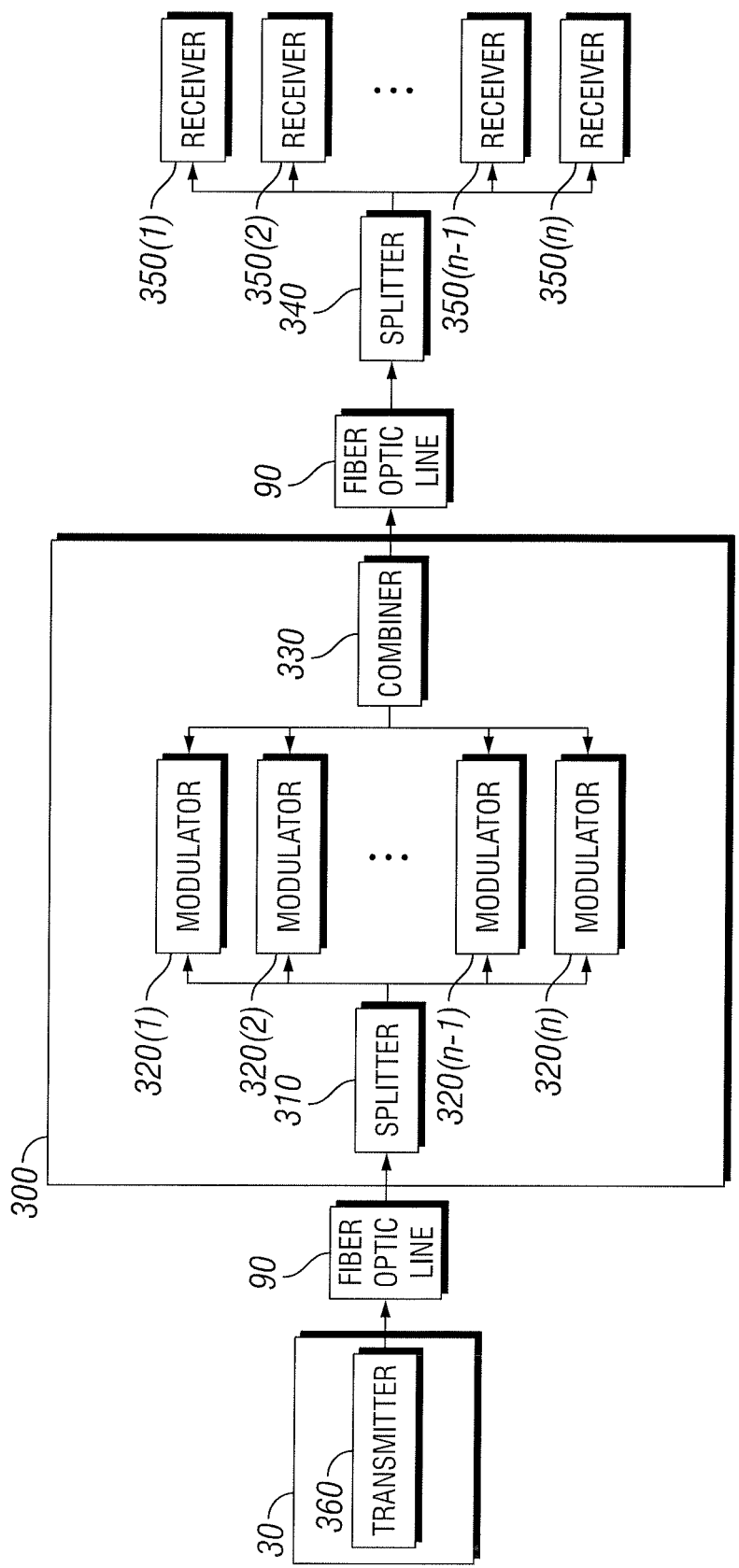
FIG. 3 is a diagram illustrating an example telemetry system, according to aspects of the present disclosure.

FIG. 3 is a diagram illustrating an example telemetry system, according to aspects of the present disclosure. A transmitter 360 may be located at the surface 82. The surface telemetry element 30 may comprise or be coupled to the transmitter 360. The telemetry element 30 may be coupled to a surface control unit 32 or may be part of the surface control unit 32. The transmitter 360 generates a light, such as coherent light, that is spectrally narrow and distinct. In one or more embodiments the transmitter 360 may comprise light composed of a plurality of narrowband and distinct wavelengths (also known as channels, teeth, or colors), such as generated by a frequency comb. The coherent light is transmitted via a fiber optic line 90 downhole as an input coherent light. For example, the fiber optic line 90 may transmit the input coherent light to a downhole tool, such as tool 26 or a wireline tool 34. The input coherent light provides the source for communicating downhole data or downlink data to the surface 82.

In one or more embodiments the fiber optic line 90 is coupled to a downhole telemetry element 300. The fiber optic line 90 may be one or more fiber optic cables, one or more communication lines, any type of fiber optics, or any combination thereof. Fiber optic line 90 may be a single line or may comprise a plurality of lines. Downhole telemetry element 300 may comprise a downhole telemetry element 28, a downhole telemetry element 36, or any other downhole telemetry element according to one or more aspects of the present disclosure. In one or more embodiments, downhole telemetry element 300 may comprise a splitter 310, a plurality of modulators 320, and a combiner 330. In one or more embodiments, any one or more of the components of downhole telemetry 300 may be positioned within or coupled to downhole telemetry element 300. Downhole telemetry element 300 may be coupled to one or more tools (for example, tool 26 or wireline tool 34), be positioned within one or more tools or by itself comprise a tool that is deployed downhole.

Downhole telemetry element 300 may comprise a splitter 310 coupled to the fiber optic line 90. Splitter 310 may comprise a wavelength division demultiplexer, an optical filter, an add-drop multiplexer, an optical waveguide (such as InP or $LiNbO_3$), a star coupler, a directional coupler, a fiber Bragg grating, an interferometer, a phase array, a diffraction grating, micro/nano optics, or any other suitable splitter. The splitter 300 separates the input coherent light into a plurality of wavelengths. For example, the splitter 300 may be a demultiplexer that separates the input coherent light into one or more colors or frequencies such that a plurality of wavelengths is extracted. Each of the plurality of wavelengths may be transmitted or guided to one or more modulators 320(1), 320(2), 320(n−1), 320(n), respectively, where "n" may represent any positive integer. For example, a 1549.8 nanometer (nm) light may be transmitted to modulator 320(1), 1549.9 nm light may be transmitted to modulator 320(2), 1550 nm light may be transmitted to modulator 320(n−1) and violet light may be transmitted to modulator 320(n). Each modulator 320 may be associated with a respective downhole tool.

A modulator 320 may encode downhole data or downlink data onto a received wavelength. The downhole data may be associated with one or more sensors or receivers of a downhole tool associated with the modulator 320. A modulator 320 may transmit the encoded downhole data to a combiner 330. The combiner 330 may comprise a wavelength division multiplexer, an optical filter, an add-drop multiplexer, an optical waveguide (such as InP or $LiNbO_3$), a star coupler, a directional coupler, a fiber Bragg grating, an interferometer, a phase array, a diffraction grating, micro/nano optics, or any other suitable splitter. Encoding schemes may be any of those standardly used in optical communications, such as on-off keying, quadrature amplitude modulation, orthogonal frequency-division multiplexing, or any other suitable scheme or custom non-standard modulation encodings. Further, the modulator may encode the downlink data by modulating the optical phase, amplitude or polarization of the light. The combiner 330 recombines the received encoded wavelengths from any one or more of the modulators 320 into a coherent light as an output coherent light. The output coherent light is transmitted to a fiber optic line 90. The fiber optic line 90 may be the same as the fiber optic line 90 that the input coherent light was received at or may be a separate fiber optic line 90. In one or more embodiments, any one or more return signals may be returned on a fiber optic line 90. In one or more embodiments, the return signals may be communicated on multiple fiber optic lines 90 by directing one or more signals to any one or more of the fibers of the fiber optic lines 90 or by directing one or more wavelengths on one fiber of the fiber optic lines 90 and other wavelengths on one or more other fibers of the fiber optic lines 90 to increase potential capacity.

The output coherent light is transmitted to a splitter 340. Splitter 340 may be located at the surface 82. Splitter 340 operates in a similar manner as splitter 310. Splitter 340 may be a demultiplexer. Splitter 340 may split the output coherent light into a plurality of wavelengths where each wavelength is transmitted to a respective or associated receiver 350. For example, the output coherent light may be split into various colors where the 1549.8 nm light is transmitted to receiver 350(1), 1549.9 nm light is transmitted to receiver 350(2), 1550 nm light is transmitted to receiver 350($n$-1) and 1550.1 nm light is transmitted to receiver 350($n$), where "n" is any positive integer. As an example, if each of 50 downhole tools encode 20 megabit per second (Mb/s) of data then 1 Gb/s of data may be transferred to the surface 82, for example, to surface control unit 32 or logging facility 44 using the downhole telemetry element 300.

Figure 4:
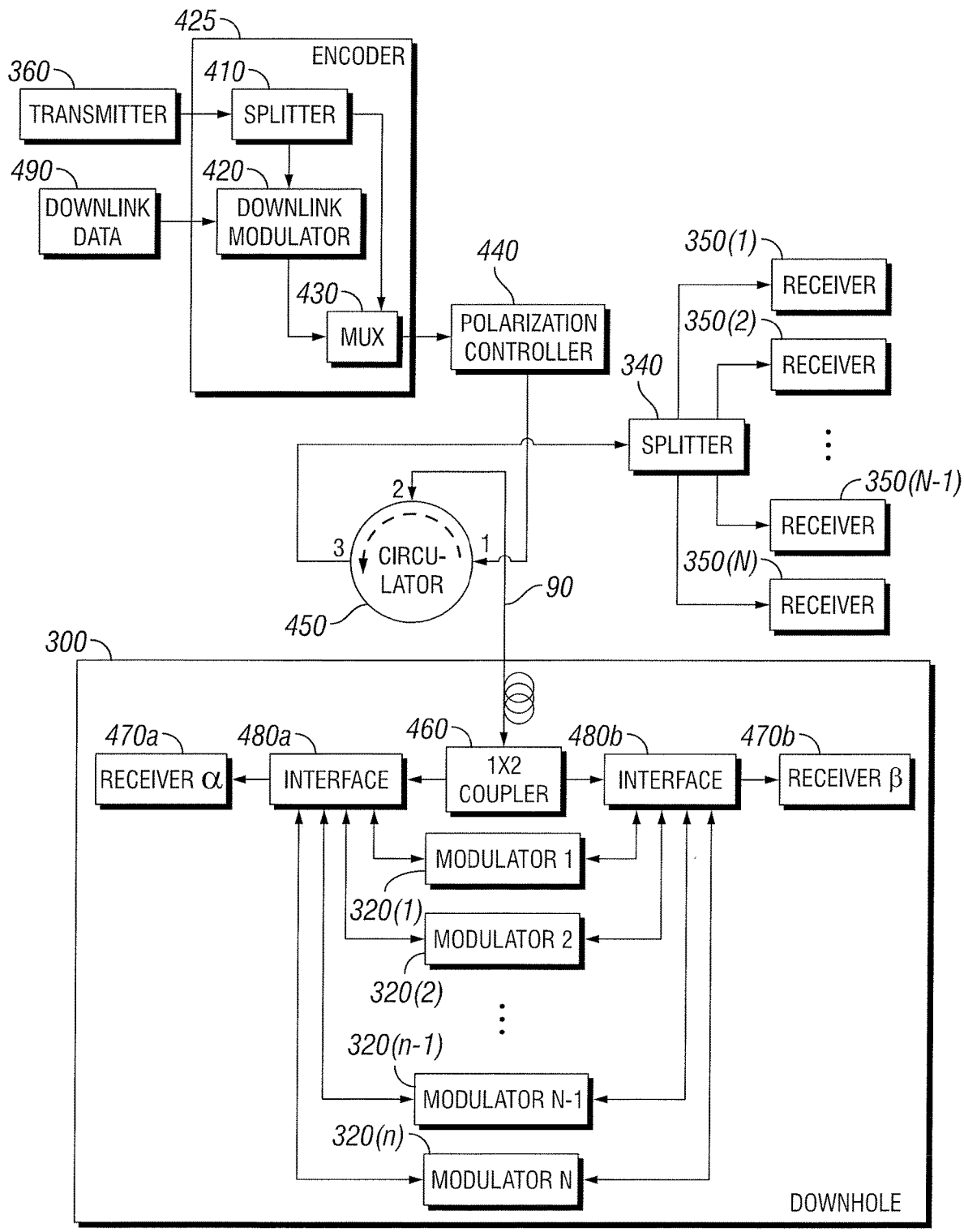
FIG. 4 is a diagram illustrating an example telemetry system, according to one or more aspects of the present disclosure.

FIG. 4 is a diagram illustrating an example telemetry system that permits bi-directional communication between one or more elements at a surface and one or more elements located downhole, according to aspects of the present disclosure. FIG. 4 illustrates a single fiber line used for an example telemetry system. A transmitter 360 is coupled to an encoder element 425. Transmitter 360 may be a frequency comb, for example, a single frequency comb. Encoder 425 may include a demultiplexer 410, downlink modulator 420 and multiplexer 430. Selected wavelengths of the light or signal received by the demultiplexer 410 from the transmitter 360 may be transmitted to a downlink modulator 420, while the other wavelengths of light pass to the multiplexer 430. The downlink modulator 420 encodes the downlink data 490 onto the demultiplexed signal. The downlink data 490 may comprise data associated with any one or more downhole tools, for example, 26 or 34. The downlink data 490 associated with a first downhole tool may be encoded on a first wavelength, and so on for each downlink data 490 associated with any other one or more downhole tools. Downlink data may consist of control commands, calibration updates, or new threshold levels. Encoding schemes may be any of those standardly used in optical communications, such as on-off keying, quadrature amplitude modulation, orthogonal frequency-division multiplexing, any other scheme or custom non-standard modulation encodings. Further, the modulator 420 may encode the downlink data by modulating the optical phase, amplitude, or polarization of the light. The encoded downlink data signal is then multiplexed back to the main signal path by multiplexer 430.

The encoded downlink data signal is transmitted from the multiplexer 430 to the polarization controller 440 and then to circulator 450. The polarization controller 440 ensures signal integrity when using a polarization sensitive modulation method, such as phase modulation. The polarization controller 440 may receive feedback control by monitoring any one or more of the signals obtained at receivers 350(1) to 350($n$). The circulator 450 transmits the encoded downlink data signal via fiber optic line 90 to the downhole telemetry element 300. In one or more embodiments, the polarization controller 440 is not present. In one or more embodiments, at least one couple with or without optical isolators is used instead of circulator 450. In one or more embodiments, a downhole data signal may be transmitted from the downhole telemetry element 300 via fiber optic line 90 to the circulator 450.

Downhole telemetry element 300 may comprise any one or more components as illustrated in FIG. 3. Downhole telemetry element 300 may comprise a 1×2 coupler 460 that receives an encoded downlink data signal or source light and transmits a downhole data signal via fiber optic line 90. The received signal is symmetrically split and transmitted to an interface 480. Interface 480 comprises an interface 480$a$ and 480$b$ coupled to each output of the 1×2 coupler 460. Any suitable type of coupler or circulator may be used. In one or more embodiments, interface 480 comprises a multiplexer and a demultiplexer. In one or more embodiments, the multiplexer and demultiplexer of interface 480 may be included within separate devices or the same device. The interface 480 may comprise prisms, thin film filters, dichroic filters, interference filters, combiners, tap couplers (for add/drop), and splitters. The interface 480 may separate wavelengths containing downlink data 490 from wavelengths that will be used for uplink telemetry.

Interface 480 may be coupled to a receiver 470 that receives the separated wavelengths containing downlink data 490. The receiver 470 may comprise a receiver 470$a$ and 470$b$ coupled to interface 480 and interface 480$b$. The receiver 470 converts optical signals into electrical signals that are demodulated and decoded to obtain commands, calibration corrections or modified thresholds and may be coupled to control logic, for example, an information handling system, a controller, a processor or any other type of control logic. A processor or logic (not shown) may control the selection of the downhole tool so as to direct the received encoded downlink data signal to the associated downhole tool. The selection may be determined autonomously by the downhole processor or logic or may be determined by a surface operator, surface information handling system, surface logic or any other surface system. For example, the associated downhole tool may be selected based, at least in part, on an identifying header encoded in the downlink signal, code division multiplexing or any other suitable identifier. The interface 480 may couple to one or more modulators 320, for example, modulators 320(1), 320(2), 320(N-1) and 320(N), wherein N is any number. The interface 480 may be directed or controlled by the processor or logic and may demultiplex the received encoded downlink data signal to the appropriate modulator 320.

Each modulator 320 may also transmit an encoded downhole data signal or uplink data signal associated with downhole data of a corresponding downhole tool to the interface 480. The interface 480 may multiplex the encoded downhole data signal and transmit the multiplexed encoded downhole data signal to the 1×2 coupler 460. The 1×2 coupler 460 may transmit the multiplexed encoded downhole data signal via fiber optic line 90 to the circulator 90. The circulator 90 may transmit the multiplexed encoded downhole data signal to a demultiplexer 340. The demultiplexer 240 separates the multiplexed encoded downhole data signal to one or more surface signals for transmission to one or more surface receivers 350, for example, receivers 350(1), 350(2), 350(N) and 350(N-1), where N represents any positive integer. In one or more embodiments, the receivers 350 may be disposed within an information handling system, such as surface control unit 32 or logging facility 44. In one or more embodiments, receivers 350 may be disposed within one or more information handling systems or may be disposed within separate devices coupled to one or more information handling systems.

Figure 5:
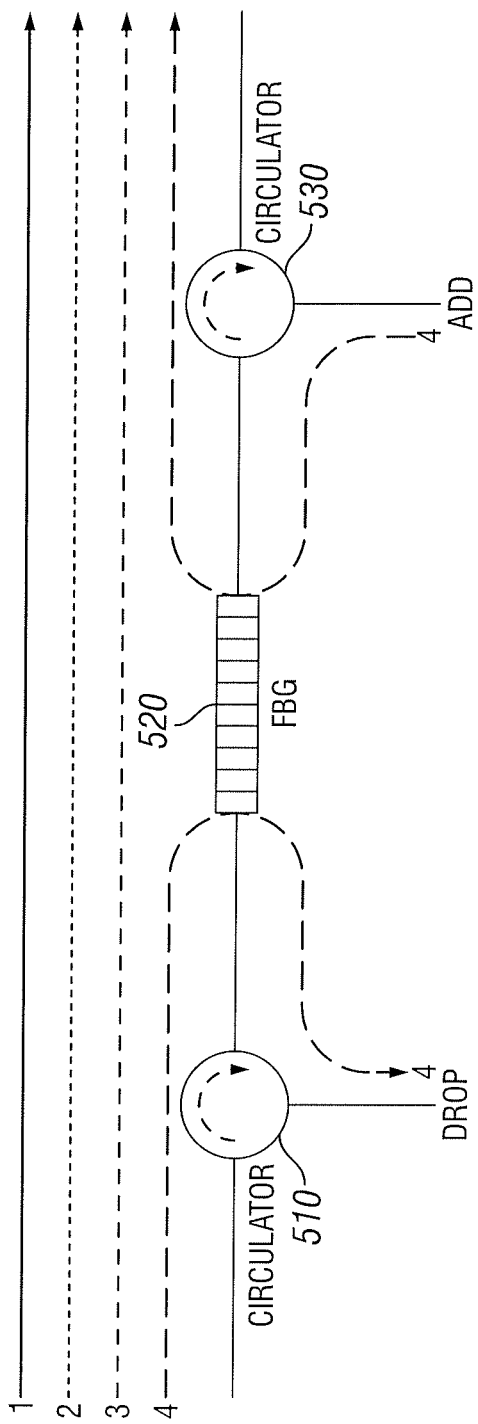
FIG. 5 is a diagram illustrating an encoder for an example telemetry system, according to one or more aspects of the present disclosure.

FIG. 5 is a diagram illustrating an encoder for an example telemetry system, according to aspects of the present disclosure. In one or more embodiments, an encoder 425 may be an optical add-drop multiplexer comprising a circulator 510 coupled to a fiber Bragg grating 520 where the fiber Bragg grating 520 is coupled to a circulator 530. The labels "Add" and "Drop" refer to the capability of the encoder 425 to add a wavelength channel to an existing multi-wavelength wavelength-division multiplexing signal and to drop or remove one or more wavelength channels, for example, passing the channel to another path.

FIGS. 6A, 6B and 6C are diagrams illustrating embodiments of modulators in a downhole telemetry element, according to aspects of the present disclosure. FIG. 6A illustrates one or more modulators 320 corresponding to one or more downhole tools 620, where the modulators 320 are collected in a tool head 610. Downhole data from each downhole tool 620 is transmitted to the tool head 610, electronically, optically, acoustically, electromagnetically, or in any other suitable way. The downhole data transmitted from each downhole tool 620 may be data collected or received from one or more sensors, formation data, fluid data, seismic data, drilling data, target object data, or any other type of downhole data.

FIG. 6B illustrates one or more modulators 320 disposed within a respective one or more downhole tools 620. A demultiplexer 630 and a multiplexer 640 may be disposed within a tool head 610. The demultiplexer 630 separates the source light into selected wavelengths and transmits the selected wavelengths to respective one or more downhole tools 620. The modulators 320 encode one or more downlink data signals of the one or more downhole tools 620. The demultiplexer 630 receives one or more downhole data signals from any one or more modulators 320.

Figure 6D:
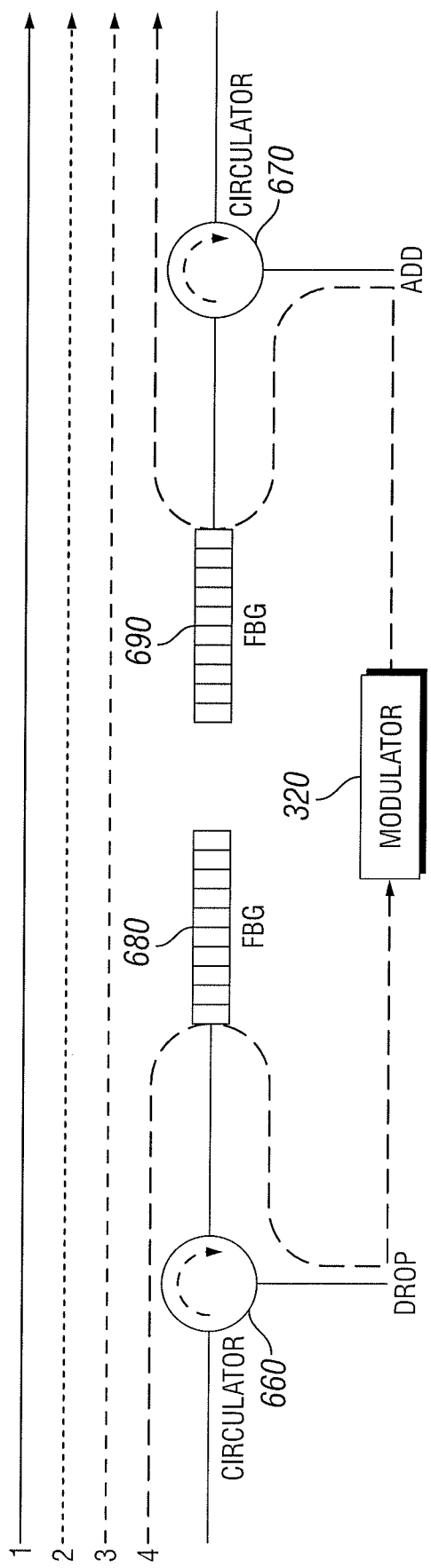

FIG. 6C illustrates modulators 320, multiplexers 640 and demultiplexers 630 disposed within respective downhole tools 620. In one or more embodiments, the multiplexer 640/demultiplexer 630 may be replaced with an add/drop multiplexer as illustrated in FIG. 6D. FIG. 6D illustrates selecting a wavelength of light or channel 4 from four separate wavelengths by circulator 660 and filter 680, such as a fiber Bragg grating, feeding the selection to the modulator 320 and transmitting downhole data from the modulator 320 to the tool head 610 via the circulator 670 and filter 690. In this manner, if a specific demultiplexer 630 or multiplexer 640 is damaged or inoperable only the downhole tool 620 associated with that inoperable demultiplexer 630 or multiplexer 640 is out of service as opposed to all downhole tools 620 as would be the case for the systems of FIGS. 6A and 6B.

Figure 7:
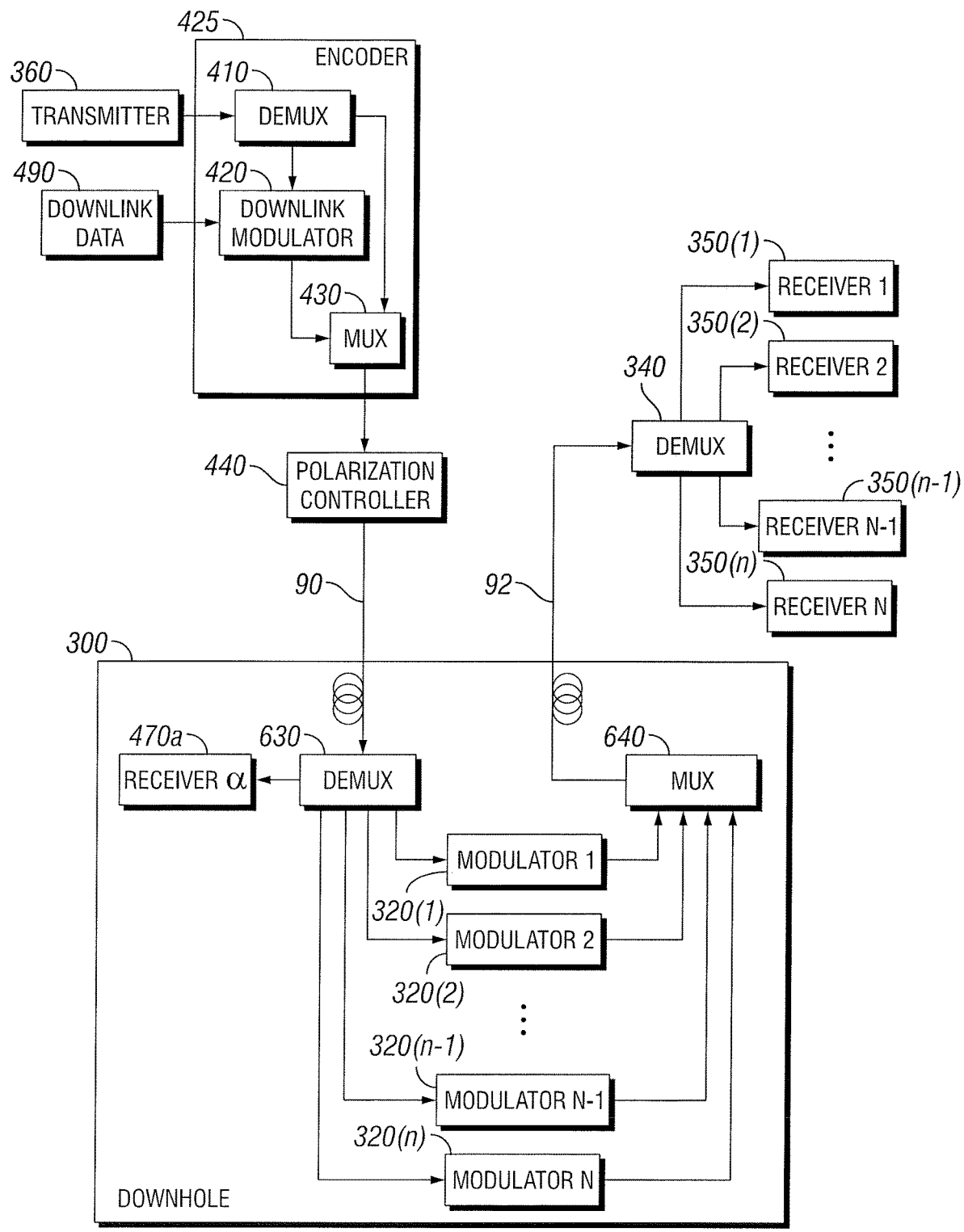
FIG. 7 is a diagram illustrating a dual fiber telemetry system, according to one or more aspects of the present disclosure.

FIG. 7 illustrates a dual fiber telemetry system, according to aspects of the present disclosure. Several differences are readily seen between the telemetry system of FIG. 7 and the telemetry system of FIG. 4. For example, the telemetry system of FIG. 7 comprises two optical fiber lines, fiber optic line 90 and fiber optic line 92. In one or more embodiments, any one or more of fiber optic line 90 and fiber optic line 92 may comprise a plurality of fiber optic lines. FIG. 7 also does not require a circulator 450 at the surface 82 or a 1×2 coupler 460 as the light has a return path. A transmitter 360, such as a frequency comb or other wavelength division multiplexed transmitted, may be coupled to an encoder element 425 as discussed above. The encoded downlink data signal is transmitted from the encoder element 425 to the polarization controller 440. In one or more embodiments, the polarization controller 440 is not present. The polarization controller 440 passes conditioned light to the downhole telemetry element 300 via fiber optic line 90. The multiplexed encoded downlink data signal is received at demultiplexer 630. The demultiplexer 630 is coupled to a receiver 470a, which extracts the downlink telemetry data to be used by the downhole tool. The encoded downlink data signal is split by the demultiplexer 630 into one or more light sources that are transmitted to one or more respective modulators 320 associated with one or more downhole tools. The modulators 320 may also transmit encoded downhole data from any one or more associated downhole tools to the multiplexer 640. The multiplexer 640 transmits the multiplexed encoded downhole data signal to a demultiplexer 340 at the surface 82. The demultiplexer 340 then transmits the multiplexed encoded downhole data signal to respective receivers 350, which extract the uplink telemetry data to be used by the operator after appropriate processing.

Figure 8:
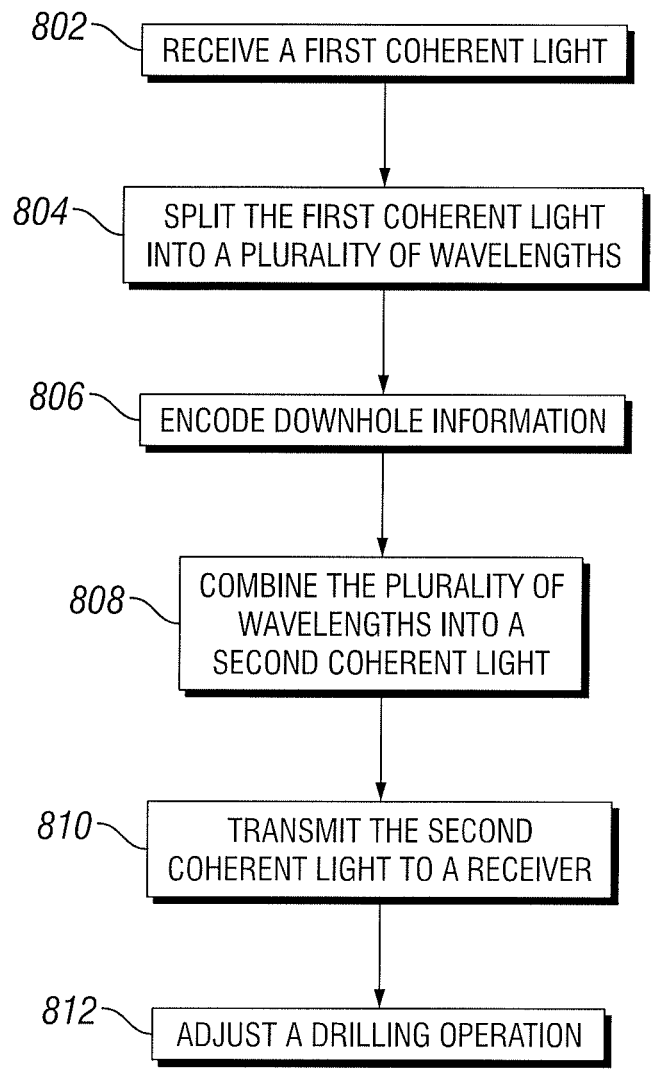
FIG. 8 is a flowchart illustrating a method for a telemetry system, according to one or more aspects of the present disclosure.

In any one or more embodiments, a fiber comb may be replaced with a laser source at distinct wavelengths that are multiplexed and demultiplexed using standard wavelength division multiplexing (WDM). In one or more embodiments a frequency comb may be disposed within a tool head 610. The downlink telemetry would operate independently or via a single or dual fiber optic system. The frequency comb downhole would be demultiplexed and each color of the source light from transmitter 360 may be modulated. The encoded data would subsequently be multiplexed and sent via fiber optic line 90 to the surface 82. FIG. 8 is a flowchart illustrating a method for a telemetry system, according to one or more aspects of the present disclosure. At step 802, a first coherent light is received from a transmitter 360. For example, the first coherent light may be received from a surface telemetry element 30 via fiber optic line 90. At step 804, the first coherent light is split into a plurality of wavelengths of light. In one or more embodiments, the wavelengths may correspond to channels, wavelengths or colors of light. The first coherent light may be split by a downhole telemetry element 300 that comprises a splitter 310.

At step 806, any one or more downhole information or data is encoded on a given wavelength. For example, a modulator 320 may receive a specific wavelength and encode downhole information from an associated downhole tool. In one or more embodiments, data from one or more sensors associated with a downhole tool is encoded on the specific wavelength. At step 808, a combiner 330 combines the wavelengths into a second coherent light where any one or more of the wavelengths may comprise encoded downhole information or data. At step 810, the second coherent light is transmitted to the surface 82 where it is received by one or more receivers 350. A splitter 340 at the surface 82 may split the second coherent light into multiple wavelengths and direct the wavelengths to appropriate receivers 350.

At step 812, one or more drilling or servicing operations may be adjusted based on the downhole information. For example, the received downhole data may be communicated from a receiver 350 to an information handling system, such as surface control unit 32 or logging facility 44, one or more commands may be communicated downhole to adjust a drilling or servicing operation, or any combination thereof or to any other tool or system according to a particular environment. Adjusting a drilling or servicing operation may comprise altering flow of production fluid, controlling angle, direction, velocity and speed of a drill bit, altering flow of wellbore fluid (for example, mud, water, or any other type of downhole fluid), altering the collection data rate of a tool, implementing advanced power management, for example, by turning a tool on or off, changing the resolution of sensor data acquired for a region of greater interest, or any other drilling operation. In one or more embodiments, a log may be generated and displayed at a display of the information handling system. The log, received downhole information or any combination thereof may also be stored. Any one or more storage devices for storing the log or downhole information may be located at the surface 82 or may be located remotely. The storage devices may comprise any type of suitable storage device and may be stored in any suitable format including, but not limited to, a database. The display may also display current downhole information and historical downhole information. The log may be generated based, at least in part, on stored downhole information. The log may be generated based, at least in part, on any one or more models that utilize any one or more of stored downhole information or current downhole information. One or more drilling operations may be adjusted based, at least in part, on the displayed or stored log. Any one or more steps of FIG. 8 may be implemented in an environment comprising a wirelines/slickline or for production logging.

Figure 9:
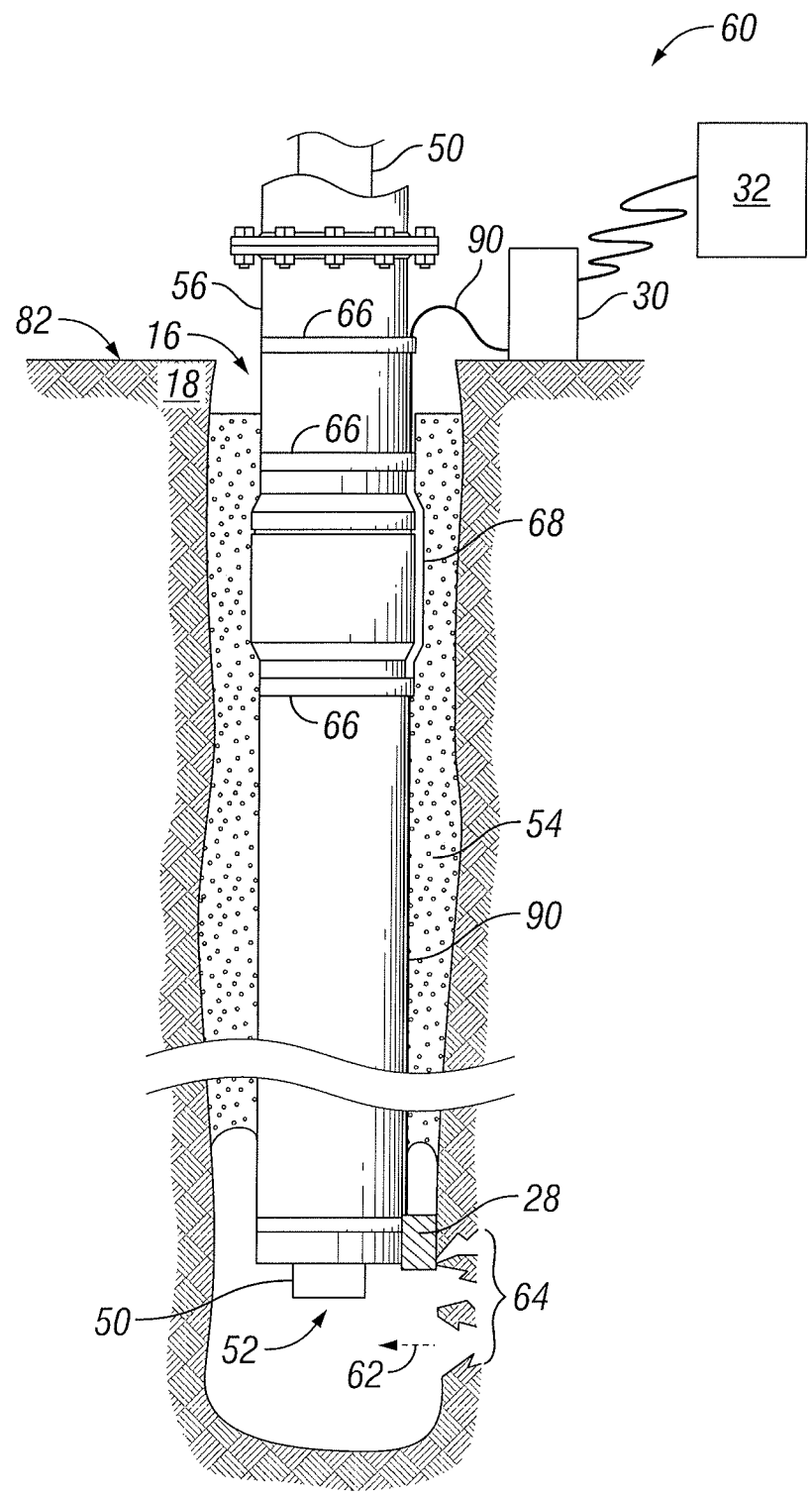
FIG. 9 is a schematic diagram of an example a telemetry system, according to one or more aspects of the present disclosure.

FIG. 9 is a schematic diagram of an example telemetry system, according to one or more aspects of the present disclosure. A well 60 is equipped with an illustrative embodiment of a telemetry system. The well 60 may be constructed and completed in any manner known to one of ordinary skill in the art. The well 60 includes a casing string 56 positioned in a borehole 16 that has been formed in the formation 18 by a drill bit (for example, drill bit 14 in FIG. 1). The casing string 56 includes multiple tubular casing sections that may be any length coupled or connected end-to-end by couplings. Within the well 60, cement 54 may be injected between an outer surface of the casing string 56 and an inner surface of the borehole 16. The cement 54 may be allowed to set. A production tubing string 50 may be positioned in an inner bore of the casing string 14.

The well 60 is adapted to guide a fluid 62, for example, a production fluid such as a hydrocarbon such as oil or gas or any other type of fluid, from a bottom of the borehole 16 to a surface 82 of the formation 18. Perforations 64 may be formed within the borehole 16 to facilitate the flow of a downhole fluid, such as fluid 62, for example, a production fluid, a formation fluid, a fluid from another well or wells, a tracer fluid, or any other fluid, into the borehole 16 and on to the surface 82 via an opening 52 at the bottom of the production tubing string 50. In one or more embodiments, perforations or openings may be located at any one or more suitable location so as to permit a fluid to flow into the borehole 16. In any embodiment, well 10 or any other well may be used.

In one or more embodiments, the downhole telemetry element 28 may be coupled to a control unit 32, a fiber optic line 90, a surface telemetry element 30 and any other component required for a given operation. In one or more embodiments, surface telemetry element may be coupled to the downhole telemetry element 28 via fiber optic line 90 and the downhole telemetry element 28 may convey information via the fiber optic line 90 to the surface telemetry element 30 at the surface 82 and then on to the control unit 32. In one or more embodiments, information conveyed via fiber optic line 90 may be transmitted to a control unit 32 using any other system suitable for a given operation.

In one embodiment, the fiber optic line 90 and the downhole telemetry element 28 extend along an outer surface of the casing string 56 and are coupled to the casing string 56 via a coupling, band (for example, band 66) or other fastener. In one or more embodiments, the fiber optic line 90 is covered by a protective covering 68 to prevent shearing of or abrasions to the fiber optic line 90. In one or more embodiments, the fiber optic line 90 and the downhole telemetry element 28 are strapped to the outside of the production tubing string 50. In one or more embodiments, downhole telemetry element 28 and fiber optic line 90 may be strapped to a wireline or any other suitable deployment device. Rather than exiting the well 10 from the annular space outside the casing, the fiber optic line 90 may exit through an appropriate port, for example, a port of a "Christmas tree" assembly. The bands 66 may also bind the fiber optic line 90 to the outer surface of the production tubing string 50. In one or more embodiments, the downhole telemetry element 28 may have a coupled fiber optic line 90 suspended inside production tubing string 50. One or more embodiments may utilize composite tubing with one or more optical fibers embedded in the wall of the tubing. The composite tubing may be employed as a casing or a production string, or any combination thereof. A coupling or terminator may be utilized at the end of the composite tubing to couple a downhole telemetry element 28 to the embedded optical fiber.

In one or more embodiments, a method comprises receiving a first coherent light from a transmitter positioned at a surface of a subterranean formation, wherein the first coherent light is received downhole, splitting the first coherent light into a plurality of wavelengths, encoding downhole information associated with one or more downhole tools onto at least one of the plurality of wavelengths, combining the plurality of wavelengths into a second coherent light at the one or more downhole tools and transmitting the second coherent light to a receiver positioned at the surface. In one or more embodiments, the method further comprises receiving downlink data at one or more receivers and adjusting one or more operational parameters associated with at least one of the one or more downhole tools based, at least in part, on the received downlink data. In one or more embodiments, splitting the first coherent light into the plurality of wavelengths comprises splitting the first coherent light into the plurality of wavelengths using a wavelength demultiplexer positioned within the one or more downhole tools. In one or more embodiments, encoding the downhole information onto at least one of the plurality of wavelengths comprises encoding data from at least one sensor of the one or more downhole tools onto at least one of the plurality of wavelengths. In one or more embodiments, encoding the downhole information onto at least one of the plurality of wavelengths comprises modulating at least one of a frequency, phase, wavelength, pulse width, polarization, time delay, and amplitude. In one or more embodiments, receiving the first coherent light comprises receiving the first coherent light through an optical pathway between the transmitter and the one or more downhole tools. In one or more embodiments, receiving the second coherent light at the receiver comprises receiving the second coherent light through the optical pathway. In one or more embodiments, receiving the second coherent light at the receiver comprises receiving the second coherent light through a second optical pathway. In one or more embodiments, transmitting the first coherent light from the transmitter positioned at the surface of the subterranean formation comprises receiving from a frequency comb transmitter light comprising a plurality of wavelengths, receiving encoded surface information onto at least one of the plurality of wavelengths and combining the plurality of wavelengths into the first coherent light.

In one or more embodiments, a telemetry system for one or more downhole operations comprises one or more downhole tools communicatively coupled to an information handling system, wherein the one or more downhole tools are deployed downhole, a splitter coupled to a fiber optic line, wherein the splitter splits a first coherent light via the fiber optic line from a surface transmitter into a plurality of wavelengths, one or more modulators coupled to the splitter, wherein the one or more modulators receive one of the plurality of wavelengths, and wherein each of the one or more downhole tools is associated with one of the one or more modulators, one or more downhole data associated with the one or more downhole tools, wherein the associated one of the one or more modulators encodes the one or more downhole data onto the associated received one of the plurality of wavelengths to form one or more encoded wavelengths, and a combiner coupled to each of the one or more modulators, wherein the combiner combines the one or more encoded wavelengths, and wherein the combiner transmits the combined one or more encoded wavelengths to an information handling system via the fiber optic line. In one or more embodiments, the first coherent light is received from a frequency comb. In one or more embodiments, the first coherent light is encoded with downlink data. In one or more embodiments, the telemetry system further comprises a coupler coupled between a first interface and a fiber optic line and a second interface and the fiber optic line, wherein the first interface comprises a first demultiplexer and a first multiplexer, and wherein the second interface comprises a second demultiplexer and a second multiplexer and a plurality of receivers coupled to the first demultiplexer and the second demultiplexer, wherein the plurality of receivers receive downlink data encoded on the fiber optic line. In one or more embodiments, the telemetry system further comprises a circulator coupled between the splitter and the fiber optic line and coupled between the combiner and the second fiber optic line, wherein the splitter comprises a demultiplexer, and wherein the combiner comprises a multiplexer and a receiver coupled to the splitter, wherein the receiver receives downlink data encoded on the first fiber optic line. In one or more embodiments, the telemetry system further comprises a tool head coupled to the one or more downhole tools, wherein the tool head comprises one or more modulators. In one or more embodiments, the telemetry system further comprises a tool head coupled to the one or more downhole tools, wherein the tool head comprises the combiner and the splitter, and wherein the one or more downhole tools comprise the one or more modulators. In one or more embodiments, the combiner comprises a plurality of combiners, wherein the splitter comprises a plurality of splitters, and wherein each of the one or more downhole tools comprise at least one of the one or more modulators, at least one of the plurality of combiners, and at least one of the plurality of the splitters. In any one or more embodiments, the splitter is a demultiplexer. In one or more embodiments, the combiner is a multiplexer. In any one or more embodiments, the first fiber optic line and the second fiber optic line are a single fiber optic line. In any one or more embodiments, the fiber optic line comprises a first fiber optic line and a second fiber optic line, wherein the splitter is coupled to the first fiber optic line, and wherein the combiner is coupled to the second fiber optic line.

In one or more embodiments, a non-transitory computer readable medium storing a program that, when executed causes a processor to receive, at a splitter, a first coherent light from a transmitter positioned at a surface of a subterranean formation, wherein the splitter is located downhole, split, by the splitter, the first coherent light into a plurality of wavelengths, encode, by one or more modulators associated with one or more downhole tools, downhole information onto at least one of the plurality of wavelengths, combine, by a combiner, the plurality of wavelengths into a second coherent light and transmit the second coherent light to a receiver positioned at the surface. In one or more embodiments, the program, when executed, further causes the processor to receive downlink data at one or more receivers and adjust one or more operational parameters associated with at least one of the one or more downhole tools based, at least in part, on the received downlink data. In one or more embodiments, the splitter comprises a wavelength demultiplexer positioned within the one or more downhole tools. In one or more embodiments, the program, when executed, further causes the processor to receive data from at least one sensor associated with at least one of the one or more downhole tools, wherein encoding the downhole information onto at least one of the plurality of wavelengths comprises encoding the data from at least one sensor of the one or more downhole tools onto at least one of the plurality of wavelengths. In one or more embodiments, encoding the downhole information onto at least one of the plurality of wavelengths comprises modulating at least one of a frequency, phase, wavelength, pulse width, polarization, time delay and amplitude. In one or more embodiments, receiving the first coherent light comprises receiving the first coherent light through an optical pathway between the transmitter and the tool. In one or more embodiments, receiving the second coherent light at the receiver comprises receiving the second coherent light through the optical pathway. In one or more embodiments, receiving the second coherent light at the receiver comprises receiving the second coherent light through a second optical pathway.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:
1. A method, comprising:
receiving a first coherent light from a transmitter positioned at a surface of a subterranean formation, wherein the first coherent light is received downhole;
splitting the first coherent light into a plurality of wavelengths;
encoding downhole information associated with one or more downhole tools onto at least one of the plurality of wavelengths;
combining the plurality of wavelengths into a second coherent light at the one or more downhole tools;
transmitting the second coherent light to a receiver positioned at the surface; and
one or more of:

receiving at a first receiver coupled to a first interface and a second receiver coupled to a second interface downlink data encoded on a fiber optic line, wherein a coupler is coupled between 1) the first interface and the fiber optic line and 2) the second interface and the fiber optic line, wherein the first interface comprises a first demultiplexer and a first multiplexer, and wherein the second interface comprises a second demultiplexer and a second multiplexer; and receiving at a third receiver coupled to a splitter the downlink data encoded on the fiber optic line, wherein a circulator is coupled between 1) the splitter and the fiber optic line, and 2) a combiner and the second fiber optic line, wherein the splitter comprises a demultiplexer, and where the combiner comprises a multiplexer.

2. The method of claim 1, further comprising:
adjusting one or more operational parameters associated with at least one of the one or more downhole tools based, at least in part, on the received downlink data.

3. The method of claim 1, wherein splitting the first coherent light into the plurality of wavelengths comprises splitting the first coherent light into the plurality of wavelengths using a wavelength demultiplexer positioned within the one or more downhole tools.

4. The method of claim 1, wherein encoding the downhole information onto at least one of the plurality of wavelengths comprises encoding data from at least one sensor of the one or more downhole tools onto at least one of the plurality of wavelengths.

5. The method of claim 1, wherein encoding the downhole information onto at least one of the plurality of wavelengths comprises modulating at least one of a frequency, phase, wavelength, pulse width, polarization, time delay, and amplitude.

6. The method of claim 1, wherein receiving the first coherent light comprises receiving the first coherent light through an optical pathway between the transmitter and the one or more downhole tools.

7. The method of claim 6, wherein receiving the second coherent light at the receiver comprises receiving the second coherent light through the optical pathway.

8. The method of claim 6, wherein receiving the second coherent light at the receiver comprises receiving the second coherent light through a second optical pathway.

9. The method of claim 1, wherein transmitting the first coherent light from the transmitter positioned at the surface of the subterranean formation comprises:
receiving from a frequency comb transmitter light comprising a plurality of wavelengths;
receiving encoded surface information onto at least one of the plurality of wavelengths; and
combining the plurality of wavelengths into the first coherent light.

10. A telemetry system for one or more downhole operations, comprising:
one or more downhole tools communicatively coupled to an information handling system, wherein the one or more downhole tools are deployed downhole;
a splitter coupled to a fiber optic line, wherein the splitter splits a first coherent light via the fiber optic line from a surface transmitter into a plurality of wavelengths;
one or more modulators coupled to the splitter, wherein the one or more modulators receive one of the plurality of wavelengths, and wherein each of the one or more downhole tools is associated with one of the one or more modulators;

one or more downhole data associated with the one or more downhole tools, wherein the associated one of the one or more modulators encodes the one or more downhole data onto the associated received one of the plurality of wavelengths to form one or more encoded wavelengths;
a combiner coupled to each of the one or more modulators, wherein the combiner combines the one or more encoded wavelengths, and wherein the combiner transmits the combined one or more encoded wavelengths to an information handling system via the fiber optic line; and
one or more of:
a coupler coupled between a first interface and a fiber optic line and a second interface and the fiber optic line, wherein the first interface comprises a first demultiplexer and a first multiplexer, and wherein the second interface comprises a second demultiplexer and a second multiplexer, and a plurality of receivers coupled to the first demultiplexer and the second demultiplexer, wherein the plurality of receivers receive downlink data encoded on the fiber optic line, wherein the one or more modulators couple to one or more of the first interface and the second interface so as to couple the one or more modulators to the splitter; and
a circulator coupled between the splitter and the fiber optic line and coupled between the combiner and the second fiber optic line, wherein the splitter comprises a third demultiplexer, and wherein the combiner comprises a third multiplexer, and a receiver coupled to the splitter, wherein the receiver receives downlink data encoded on the first fiber optic line, and wherein the one or more modulators couple to the splitter via the circulator.

11. The telemetry system of claim 10, wherein the first coherent light is received from a frequency comb.

12. The telemetry system of claim 11, wherein the first coherent light is encoded with downlink data.

13. The telemetry system of claim 10, further comprising a tool head coupled to the one or more downhole tools, wherein the tool head comprises the one or more modulators.

14. The telemetry system of claim 10, further comprising a tool head coupled to the one or more downhole tools, wherein the tool head comprises the combiner and the splitter, and wherein the one or more downhole tools comprise the one or more modulators.

15. The telemetry system of claim 10, wherein the combiner comprises a plurality of combiners, wherein the splitter comprises a plurality of splitters, and wherein each of the one or more downhole tools comprise at least one of the one or more modulators, at least one of the plurality of combiners, and at least one of the plurality of the splitters.

16. The telemetry system of claim 10, wherein the splitter is a demultiplexer.

17. The telemetry system of claim 10, wherein the combiner is a multiplexer.

18. The telemetry system of claim 10, wherein the first fiber optic line and the second fiber optic line are a single fiber optic line.

19. The telemetry system of claim 10 wherein the fiber optic line comprises a first fiber optic line and a second fiber optic line, wherein the splitter is coupled to the first fiber optic line, and wherein the combiner is coupled to the second fiber optic line.

20. The telemetry system of claim 10, further comprising one of:
wherein the one or more modulators are disposed in a tool head, and wherein one or more downhole tools communicate data to a respective one or more modulators;
wherein the one or more modulators are disposed in one or more downhole tools, wherein the one or more downhole tools communicate data to a tool head multiplexer of a tool head, and wherein the one or more downhole tools receives data from a tool head demultiplexer of the tool head; or
wherein each of one or more downhole tools comprises at least one of the one or more modulators, wherein one or more downhole tool demultiplexers and one or more downhole tool multiplexers are associated with at least one of the one or more downhole tools, wherein the one or more downhole tools communicate data to one or more of the downhole tool multiplexers, and wherein the one or more downhole tools receive data from the one or more downhole tool demultiplexers.

21. A non-transitory computer readable medium storing a program that, when executed, causes a processor to:
receive, at a splitter, a first coherent light from a transmitter positioned at a surface of a subterranean formation, wherein the splitter is located downhole;
split, by the splitter, the first coherent light into a plurality of wavelengths;
encode, by one or more modulators associated with one or more downhole tools, downhole information onto at least one of the plurality of wavelengths;
combine, by a combiner, the plurality of wavelengths into a second coherent light;
transmit the second coherent light to a receiver positioned at the surface; and
one or more of:
receive at a first receiver coupled to a first interface and a second receiver coupled to a second interface downlink data encoded on a fiber optic line, wherein a coupler is coupled between 1) the first interface and the fiber optic line and 2) the second interface and the fiber optic line, wherein the first interface comprises a first demultiplexer and a first multiplexer, and wherein the second interface comprises a second demultiplexer and a second multiplexer; and
receive at a third receiver coupled to the splitter the downlink data encoded on the fiber optic line, wherein a circulator is coupled between 1) the splitter and the fiber optic line, and 2) the combiner and the second fiber optic line, wherein the splitter comprises a demultiplexer, and where the combiner comprises a multiplexer.

22. The non-transitory computer readable medium of claim 21, wherein the program, when executed, causes the processor to:
receive downlink data at one or more receivers; and
adjust one or more operational parameters associated with at least one of the one or more downhole tools based, at least in part, on the received downlink data.

23. The non-transitory computer readable medium of claim 21, wherein the splitter comprises a wavelength demultiplexer positioned within the one or more downhole tools.

24. The non-transitory computer readable medium of claim 21, wherein the program, when executed, causes the processor to receive data from at least one sensor associated with at least one of the one or more downhole tools, wherein encoding the downhole information onto at least one of the plurality of wavelengths comprises encoding the data from at least one sensor of the one or more downhole tools onto at least one of the plurality of wavelengths.

25. The non-transitory computer readable medium of claim 21, wherein encoding the downhole information onto at least one of the plurality of wavelengths comprises modulating at least one of a frequency, phase, wavelength, pulse width, polarization, time delay and amplitude.

26. The non-transitory computer readable medium of claim 21, wherein receiving the first coherent light comprises receiving the first coherent light through an optical pathway between the transmitter and the tool.

27. The non-transitory computer readable medium of claim 26, wherein receiving the second coherent light at the receiver comprises receiving the second coherent light through the optical pathway.

28. The non-transitory computer readable medium of claim 26, wherein receiving the second coherent light at the receiver comprises receiving the second coherent light through a second optical pathway.

* * * * *